United States Patent [19]

Dersch et al.

[11] Patent Number: 4,749,735

[45] Date of Patent: Jun. 7, 1988

[54] BINDERS FOR AQUEOUS, PHYSICALLY DRYING ANTICORROSION COATINGS BASED ON A POLYMER DISPERSION CONTAINING A MONOALKYL PHOSPHATE

[75] Inventors: Rolf Dersch, Frankenthal; Heribert Kossmann, Ludwigshafen; Eckehardt Wistuba, Bad Duerkheim, all of Fed. Rep. of Germany

[73] Assignee: BASF Aktiengesellschaft, Ludwigshafen, Fed. Rep. of Germany

[21] Appl. No.: 876,469

[22] Filed: Jun. 20, 1986

[30] Foreign Application Priority Data

Jun. 29, 1985 [DE] Fed. Rep. of Germany ....... 3523319

[51] Int. Cl.$^4$ .............................. C08K 5/52; C09K 3/00
[52] U.S. Cl. ...................................... 524/127; 524/145; 524/424; 524/523; 524/832
[58] Field of Search .............................. 524/127, 145; 252/389 A

[56] References Cited

U.S. PATENT DOCUMENTS

| | | | |
|---|---|---|---|
| 3,137,583 | 6/1964 | Bryan et al. | 524/127 |
| 3,554,790 | 1/1971 | Gehman et al. | 117/161 |
| 3,840,392 | 10/1974 | Schuster et al. | 117/119.6 |
| 3,926,894 | 12/1975 | de Paul Clark | 524/127 |
| 3,941,713 | 3/1976 | Dawson et al. | 252/82 |
| 3,963,688 | 6/1976 | Lorenz et al. | 526/193 |
| 4,104,100 | 8/1978 | Anders et al. | 204/181 R |
| 4,350,531 | 9/1982 | Distler et al. | 524/145 |
| 4,493,904 | 1/1985 | Mack | 526/125 |
| 4,604,416 | 8/1986 | Nakai et al. | 524/145 |

FOREIGN PATENT DOCUMENTS

| | | |
|---|---|---|
| 2533043 | 2/1976 | Fed. Rep. of Germany ...... 524/127 |
| 1327030 | 8/1973 | United Kingdom . |
| 1543974 | 4/1979 | United Kingdom . |

*Primary Examiner*—Joseph L. Schofer
*Assistant Examiner*—N. Sarofim
*Attorney, Agent, or Firm*—Oblon, Fisher, Spivak, McClelland & Maier

[57] ABSTRACT

Aqueous anticorrosion coatings which contain a binder based on styrene/alkyl (meth)acrylate copolymer dispersions which contain (a) from 0.5 to 4% by weight of a monoalkyl phosphate having a phosphorus content of not less than 7% and (b) from 0.1 to 3.5% by weight of an oxyethylated alkylphenol, where alkyl is of 8 or 9 carbon atoms, and/or of an oxyethylated $C_8$–$C_{18}$-fatty alcohol, the percentages by weight being based on the amount of copolymer and the copolymers having a mean particle diameter of from 0.01 to 0.5 μm and an MFT of from 5° to 50° C., exhibit good adhesion, especially to iron and steel, and are particularly resistant to weathering.

17 Claims, No Drawings

BINDERS FOR AQUEOUS, PHYSICALLY DRYING ANTICORROSION COATINGS BASED ON A POLYMER DISPERSION CONTAINING A MONOALKYL PHOSPHATE

BACKGROUND OF THE INVENTION

1. Field of the Invention

The present invention relates to monoalkyl phosphate-containing polymer dispersions which are used as binders for anticorrosion coatings.

2. Discussion of the Background

Anticorrosion coatings are coating materials whose anticorrosion action is determined on the one hand by the binder and on the other hand by the pigments or fillers.

Today, anticorrosion paints which cause little pollution are being produced to an increasing extent using water-dilutable binders, such as alkyd resin emulsions, solvent-containing alkyd resins which are water-dilutable or water-soluble after neutralization with an amine, and polymer dispersions.

The requirements which have to be met by water-dilutable binders used in anticorrosion paints are that the polymer film swells only slightly in water and that the polymer dispersion in stable to metal ions, eg. zinc ions, so that active anticorrosion pigments, such as zinc phosphate, can be used. Furthermore, the anticorrosion coating should exhibit good adhesion to various metals, especially iron and steel, should be resistant to chalking and weathering and should protect the coated substrate from corrosion.

Since aqueous alkyd resin systems are stable neither to metal ions nor to the effects of weathering and are not resistant to chalking, they are virtually useless for anticorrosion coatings. Moreover, the solvent present in these binder systems in concentrations of up to about 40%, based on solid alkyd resin, has an adverse effect on the environment.

Coating materials based on polymer dispersions dry more rapidly than alkyd resin systems and are more stable to weathering and to chalking, but their stability to metal ions is unsatisfactory in some cases, especially since many polymer dispersions coagulate when active pigments, such as zinc phosphate, are added, because the stability of their emulsifier systems is insufficient. The quality of the corrosion protection afforded by coating materials based on polymer dispersions is determined by the monomer composition of the polymers and the emulsifier system of the polymer dispersion.

Emulsifiers which have proven useful are nonionic compounds, for example oxyethylated alkylphenols and fatty alcohols, and anionic compounds, such as alkylsulfates, sulfated alkyl oxyethylates and mono- and di-phosphates. For example, German Laid-Open Application DOS No. 2,533,043 describes, inter alia, phosphate emulsifiers for the emulsion polymerization of olefinically unsaturated monomers, these emulsifiers being intended to improve the color stability during heating of the films formed from the polymer dispersions. U.S. Pat. No. 4,104,100 discloses polyanionic phosphate emulsifiers for polymer dispersions for anodic electrocoating, these emulsifiers having an advantageous effect on the deposition of the polymer films. Finally, British Pat. No. 1,327,030 describes phosphorus-containing polymer dispersions which are used as binders for strippable coatings having a low pigment content. These strippable coatings must be capable of being removed easily from substrate metals which are temporarily protected by these coatings.

SUMMARY OF THE INVENTION

It is an object of the present invention to provide a polymer dispersion whose monomer composition and emulsifier system are matched up with one another so that it is suitable as a binder for aqueous anticorrosion coatings and does not have the above disadvantages.

We have found that this object is achieved, and that styrene/alkyl (meth)acrylate copolymer dispersions can be particularly advantageously used as binders for anticorrosion coating materials, if they contain (a) from 0.5 to 4% by weight of a monoalkyl phosphate having a phosphorus content of not less than 7% and (b) from 0.1 to 3.5% by weight of an oxyethylated alkylphenol, where alkyl is of 8 or 9 carbon atoms, and/or of an oxyethylated $C_8$–$C_{18}$-fatty alcohol, the percentages being based on the amount of copolymer, and the polymers having a mean particle diameter of from 0.01 to 0.5 $\mu$m and a minimum film forming temperature (MFT) of from 5° to 50° C. The novel dispersions may furthermore contain zinc salt solutions, eg. zinc ammonium carbonate and zinc ammonium polyacrylate solutions, in amounts such that the amount of zinc ions is from 0.5 to 10, preferably from 1 to 5, % by weight, based on the amount of copolymer.

DETAILED DESCRIPTION OF THE PREFERRED EMBODIMENTS

To prepare the novel styrene/(meth)acrylate copolymer dispersions, styrene can be copolymerized in a conventional manner with alkyl (meth)acrylates, in particular (meth)acrylates of $C_4$–$C_{18}$-alkanols, such as n-butanol, isobutanol, tert-butanol, 2-ethylhexyl alcohol or lauryl alcohol, as well as cyclohexyl alcohol, norbornanol and 4-tert-butylcyclohexanol, in aqueous emulsion in the presence of the monoalkyl phosphate (a) and the oxyethylation product (b), using a conventional free radical polymerization initiator. The amount of monomers is in general from 35 to 65% by weight, based on the total amount of the monomers, the dispersants and the water.

The copolymers may additionally contain, as copolymerized units, acrylonitrile in amounts of up to 30% by weight, based on copolymer. Preferably used copolymers are those based on styrene and n-butyl acrylate or 2-ethylhexyl acrylate. The polymers preferably additionally contain, as copolymerized units, from 0.2 to 3% by weight of mono- and/or dicarboxylic acids of 3 to 5 carbon atoms and/or their amides, eg. acrylic acid, methacrylic acid, fumaric acid, itaconic acid, maleic acid, acrylamide or methacrylamide.

Monoalkyl phosphates having a phosphate content of not less than 7% by weight are employed as component (a), in amounts of from 0.5 to 4, preferably from 0.8 to 1.8, % by weight. The monoalkyl phosphates, which are acidic by nature, are brought, before being used, to a pH of from 7.5 to 10.5, preferably from 8 to 9, with a base, in general ammonia. The monoalkyl phosphates used according to the invention possess straight chain alkyl radicals of 5 to 24, in particular 7 to 17, carbon atoms. Mixtures of various monoalkyl phosphates may also be used. Preferably, the monoalkyl phosphates are not oxyethylated. Examples of suitable monoalkyl phosphates are dodecyl phosphate (phosphorus content: 11.6%), dodecyl ether phosphate containing 2 moles of ethylene oxide (P content: 8.8%), dodecyl ether phosphate containing 3 moles of EO (P content: 7.8%) and octadecyl phosphate (P content: 8.9%).

Oxyethylated alkylphenols and/or fatty alcohols are used as component (b). In the oxyethylated alkylphenols, alkyl is preferably n- or isooctyl or -nonyl. Their degree of oxyethylation corresponds in general to 8–40, preferably 20–30, ethylene oxide radicals per molecule. The oxyethylated fatty alcohols possess alcohol groups of 8 to 18 carbon atoms. The amount of the oxyethylated product (b) is from 0.1 to 3.5, preferably from 0.3 to 1.5% by weight based on the copolymers.

The preparation of the styrene/alkyl (meth)acrylate copolymer dispersions by the conventional emulsion polymerization methods can be carried out using, in particular, water-soluble polymerization initiators, such as ammonium peroxydisulfate, potassium peroxydisulfate and sodium peroxydisulfate. If redox catalysts are used, potassium peroxydiphosphate may also be used as an oxidation component, in addition to the conventional reduction components, such as ascorbic acid, sodium formaldehyde sulfoxilate and sodium bisulfite.

The polymerization temperature can be varied within a fairly wide range and is in general from 65° to 95° C. The total amount of the monomers is preferably from 45 to 60% by weight, based on the total amount of monomers, dispersants and water. The dispersions generally have light transmission values (LT values; measured on the dispersion diluted to 0.01% by weight) of from 40 to 90%, preferably from 50 to 80%, and an MFT of from 5° to 50° C., preferably from 12° to 25° C. Their pH is in general from 6 to 9.5, preferably from 7 to 8.5, and can be established by the addition of, for example, ammonia.

The novel polymers dispersions can be particularly advantageously used as binders for the preparation of anticorrosion coatings for iron and steel. Pigmentation can be effected using, for example, active pigments such as zinc phosphate and zinc borate, which are employed in amounts of, in general, from 3 to 25%, based on the total formulation.

Examples of suitable fillers are calcites, dolomites, barite, talc and mica, which may be present in general in amounts of from 1.5 to 40% by weight, based on the total formulation.

Conventional film forming assistants, such as glycol ethers, glycol ether acetates, mineral spirits containing aromatics, and derivatives of propylene oxide with alkanols of, in general, 1 to 4 carbon atoms, may be present in amounts of, in general, from 1 to 5% by weight, in order to effect film formation.

Examples of other assistancts which may be added to the anticorrosion paints are thickeners, for example those based on urethane, and antifoams, for example those based on mineral oils or silicones.

The anticorrosion coatings can be prepared by a conventional method, and may be applied onto the substrates, for example onto metallic substrates, in particular those consisting of iron or steel, by spraying, painting, rolling, immersion or flow coating.

In the Examples which follow, parts and percentages are by weight.

PREPARATION OF THE POLYMER DISPERSIONS

EXAMPLE 1

A mixture of 400 parts of water, 25 parts of a 20% strength aqueous solution of p-isooctylphenol oxyethylated with 25 moles of ethylene oxide, and 7.25 parts of a 20.8% strength aqueous solution of a monophosphate of a straight-chain fatty alcohol which contains 10.9% by weight of organically bonded phosphorus and has been neutralized with ammonia before being added is initially taken in a polymerization vessel equipped with a stirrer, a reflux condenser, a thermometer and two feed vessels. The following mixtures are prepared for the feeds:

Feed I:
358 parts of water,
64.8 parts of a 20.8% strength aqueous solution of the monophosphate,
26 parts of acrylic acid,
16 parts of 50% strength acrylamide solution,
8 parts of methacrylamide,
300 parts of styrene,
400 parts of 2-ethylhexyl acrylate and
300 parts of methyl methacrylate.

Feed II:
160 parts of water and
4.1 parts of potassium persulfate.

Feed III:
1 parts of tert-butyl hydroperoxide and
15 parts of a 20% strength solution of a p-isooctylphenol which is oxyethylated with 25 moles of ethylene oxide.

Feed IV:
0.6 part of formaldehyde sulfoxilate (Na salt) and
10 parts of water.

The contents of the vessel are heated, while stirring. At 85° C., 10% of feed II is added to the vessel. After from 2 to 3 minutes, feed I is metered in uniformly in the course of 3 hours, while at the same time feed II is introduced uniformly over 3.5 hours. When feed II has been completely added, stirring is continued for a further 1.5 hours at 85° C., after which the mixture is cooled. At an internal temperature of 30° C., feed III is first added, followed by feed IV, and stirring is continued for a further 30 minutes. The pH is then brought to 8–8.5 by adding 25% strength aqueous ammonia. A 50% strength aqueous dispersion having an LT value of 64% of an MFT of 23° C. is obtained.

EXAMPLE 2

The procedure described in Example 1 is followed, except that feed I is altered as follows:
385 parts of water,
64.8 parts of a 20.8% strength aqueous solution of the monophosphate described in Example 1 (phosphorus content: 10.9%, neutralized with ammonia),
26 parts of acrylic acid,
16 parts of a 50% strength acrylamide solution,
8 parts of methacrylamide,
710 parts of n-butyl methacrylate,
220 parts of 2-ethylhexyl acrylate and
70 parts of styrene.

A 50% strength aqueous dispersion having an LT value of 78 and an MFT of 17° C. is obtained.

EXAMPLE 3

The procedure described in Example 1 is followed, except that feed I is altered as follows:
- 358 parts of water,
- 64.8 parts of a 20.8% strength aqueous solution of the monophosphate described in Example 1 (phosphorus content: 10.9%, neutralized with ammonia),
- 26 parts of acrylic acid,
- 16 parts of a 50% strength acrylamide solution,
- 8 parts of methacrylamide,
- 540 parts of styrene and
- 460 parts of 2-ethylhexyl acrylate.

A 50% strength aqueous dispersion is obtained, and 1.35% by weight of zinc ammonium carbonate is stirred into this dispersion. The LT value of the dispersion is 64% and the MFT is 17° C.

COMPARATIVE EXAMPLES

Dispersion 4

400 parts of water, 25 parts of a 20% strength solution of a p-isooctylphenol oxyethylated with 25 moles of ethylene oxide, and 5 parts of 30% strength aqueous sodium lauryl ether phosphate solution (organically bonded phosphorus: 3.8% by weight) are initially taken.

Feed I:
- 380 parts of water,
- 45 parts of a 30% strength aqueous sodium lauryl ether phosphate solution (organically bonded phosphorus: 3.8% by weight),
- 26 parts of acrylic acid,
- 16 parts of 50% strength acrylamide solution,
- 8 parts of methacrylamide,
- 540 parts of styrene and
- 460 parts of 2-ethylhexyl acrylate.

The procedure is otherwise carried out as described in Example 1, and a 50% strength aqueous dispersion having an LT value of 84% of an MTF of 13° C. is obtained.

Dispersion 5

400 parts of water, 25 parts of a 20% strength aqueous solution of a p-isooctylphenol oxyethylated with 25 moles of ethylene oxide, and 1.7 parts of a 35% strength solution of a sulfated oxyethylated p-isooctylphenol (degree of oxyethylation 20) are initially taken.

Feed I:
- 388 parts of water,
- 41.1 parts of a 35% strength aqueous solution of the sulfated oxyethylated p-isooctylphenol,
- 26 parts of acrylic acid,
- 16 parts of a 50% strength acrylamide solution,
- 8 parts of methacrylamide,
- 500 parts of styrene and
- 500 parts of butyl acrylate.

The procedure is otherwise carried out as described in Example 1, and a 50% strength aqueous dispersion having an LT value of 88% and an MFT of 20° C. is obtained.

Preparation of anticorrosion paints (primers)

The components stated in the recipe are mixed in the sequence shown, with stirring:

| | |
|---|---|
| Water | 36 parts |
| Sodium benzoate | 4 parts |
| Ammonium salt of a polyacrylic acid | 1 part |
| Butylglycol | 10 parts |
| Micronized zinc phosphate | 67 parts |
| Zinc 5-nitroisophthalate | 7 parts |
| (corrosion inhibitor) | |
| Polymer dispersion (Example 1, 2 or 3) | 131 parts |
| Titanium dioxide (rutile) | 51 parts |
| Chrome green | 40 parts |
| Polymer dispersion (Example 1, 2 or 3) | 51 parts |
| Calcite 5 μm | 65 parts |
| Mineral spirit, 140–210° C. | 10 parts |
| Polymer dispersion (Example 1, 2 or 3) | 520 parts |
| Antifoam (mixture of mineral oil, fat soaps, alcohols and emulsifiers) | 5 parts |
| | 998 parts |

Pigment volume concentration: about 17%
Viscosity (Rheomat 15, C 13): 500 mPa.s

The anticorrosion paints (1), (2) and (3) are applied onto clean degreased deep drawing sheets in such a way that, after drying at room temperature for 3 days a dry layer 50 μm or 80 μm thick is obtained.

For comparison, anticorrosion paints are produced using the same recipe and employing dispersions (4) and (5) as binders, and are applied onto deep drawing sheets.

The test data are summarized in the Table below.

TABLE

| | Test data | | |
|---|---|---|---|
| Test | Test in damp heat atmosphere according to DIN 50,017 | Salt spray test according to DIN 50,021 | Sub-surface corrosion at the cut |
| Example 1 Thickness of dry film | | | |
| 50 μm | 40 days satisfactory | 120 h satisfactory | 1 mm |
| 80 μm | | 240 h satisfactory | 1–2 mm |
| Example 2 Thickness of dry film | | | |
| 50 μm | 40 days satisfactory | 120 h satisfactory | 1–2 mm |
| 80 μm | | 240 h satisfactory | 1–2 mm |
| Example 3 Thickness of dry film | | | |
| 50 μm | 40 days satisfactory | 120 h satisfactory | 1 mm |
| 80 μm | | 240 h satisfactory | 1 mm |
| Comparative experiment dispersion 4 Thickness of dry film | | | |
| 50 μm | 40 days satisfactory | 120 h satisfactory | 6 mm |
| 80 μm | | 240 h satisfactory | 8 mm |
| Comparative experiment dispersion 5 Thickness of dry film | | | |
| 50 μm | 40 days satisfactory | 120 h satisfactory | 10 mm |
| 80 μm | | 240 h satisfactory | 10 mm |

We claim:

1. A binder for aqueous anticorrosion paints based on a styrene/alkyl (meth)acrylate copolymer dispersion, where the copolymer in the said dispersion has a mean particle diameter of from 0.01 to 0.5 μm and a minimum film forming temperature of from 5° to 50° C., wherein the said dispersion is prepared by copolymerizing styrene and a (meth)acrylate of a $C_4$-$C_{18}$ alkanol in an aqueous emulsion in the presence of:
  (a) from 0.5 to 4% by weight of a mono($C_{5-24}$)alkyl phosphate having a phosphorus content of not less than 7%; and
  (b) from 0.1 to 3.5% by weight of an oxyethylated ($C_{8-9}$)alkylphenol, or from 0.1 to 3.5% by weight of an oxyethylated ($C_{8-18}$) fatty alcohol, wherein the percentages are based on the amount of copolymer, and said binder comprises a zinc ammonium salt soluble in water in an amount of from 0.5 to 10% by weight, based on the amount of copolymer.

2. The binder of claim 1, wherein the zinc ammonium salt is zinc ammonium carbonate, zinc ammonium polyacrylate, or a combination thereof.

3. The binder of claim 1, comprising a zinc ammonium salt soluble in water in an amount of from 1 to 5% by weight, based on the amount of copolymer.

4. The binder of claim 1, wherein the $C_4$-$C_{18}$ alkanol comprises n-butanol, isobutanol, tert-butanol, 2-ethylhexyl alcohol, lauryl alcohol, cyclohexyl alcohol, norbornanol, or 4-tert-butyl cyclohexanol.

5. The binder of claim 1, wherein the said dispersion is prepared by copolymerizing styrene and a (meth)acrylate of a $C_4$-$C_{18}$ alkanol in a total amount of styrene and (meth)acrylate of from 35 to 65% by weight, based on the total amount of monomers, dispersants, and water.

6. The binder of claim 1, wherein the said copolymer comprises acrylonitrile in an amount of up to 30% by weight.

7. The binder of claim 1, wherein the said copolymer is a copolymer based on styrene and either n-butyl acrylate or 2-ethylhexyl acrylate.

8. The binder of claim 1, wherein the said copolymer comprises, as copolymerized units, from 0.2 to 3% by weight of a mono-($C_{3-5}$)carboxylic acid, a di-($C_{3-5}$)-carboxylic acid, or one of their amides.

9. The binder of claim 8, wherein the said mono-($C_{3-5}$)carboxylic acid comprises acrylic acid, methacrylic acid, or a combination thereof.

10. The binder of claim 8, wherein the said di-($C_{3-5}$)-carboxylic acid comprises fumaric acid, itaconic acid, maleic acid, or a combination thereof.

11. The binder of claim 8, wherein the said amide comprises acrylamide, methacrylamide, or a combination thereof.

12. The binder of claim 1, wherein component (a) is used in an amount of from 0.8 to 1.8% by weight.

13. The binder of claim 1, comprising using for component (a), a mono($C_{7-17}$)alkyl phosphate.

14. The binder of claim 1, wherein the said mono($C_{5-24}$)alkyl phosphate comprises dodecyl phosphate, dodecyl ether phosphate containing 2 moles of ethylene oxide, dodecyl ether phosphate containing 3 moles of ethylene oxide, or octadecyl phosphate.

15. The binder of claim 1, wherein the said oxyethylated ($C_{8-9}$)alkyl phenol or the said oxyethylated ($C_8$-$C_{18}$)-fatty alcohol possesses a degree of oxyethylation corresponding to 8 to 40 ethylene oxide radicals per molecule.

16. The binder of claim 1, wherein the said oxyethylated ($C_{8-9}$)alkylphenol or the said oxyethylated ($C_{8-18}$)-fatty alcohol possesses a degree of oxyethylation of from 20 to 30 ethylene oxide radicals per molecule.

17. The binder of claim 1, wherein from 0.3 to 1.5% by weight of component (b), based on the copolymers, is used.

* * * * *